J. A. GIVENS.
VEHICLE DIRECTION INDICATOR.
APPLICATION FILED MAY 3, 1911.
1,023,732.
Patented Apr. 16, 1912.
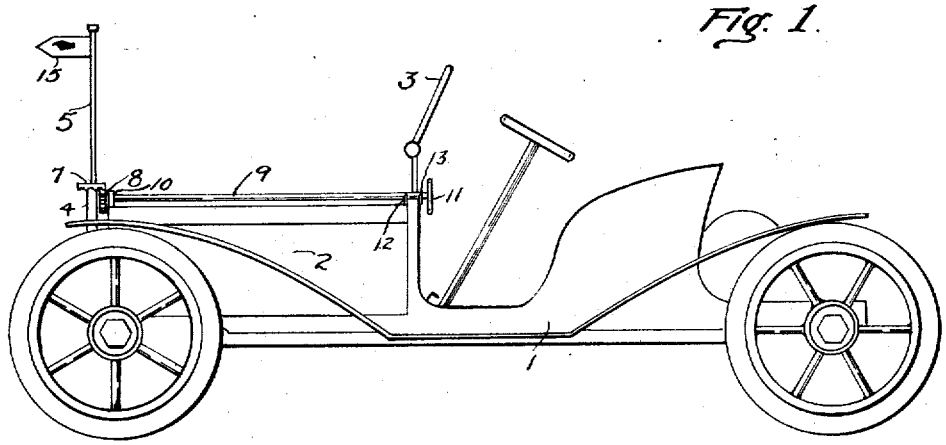
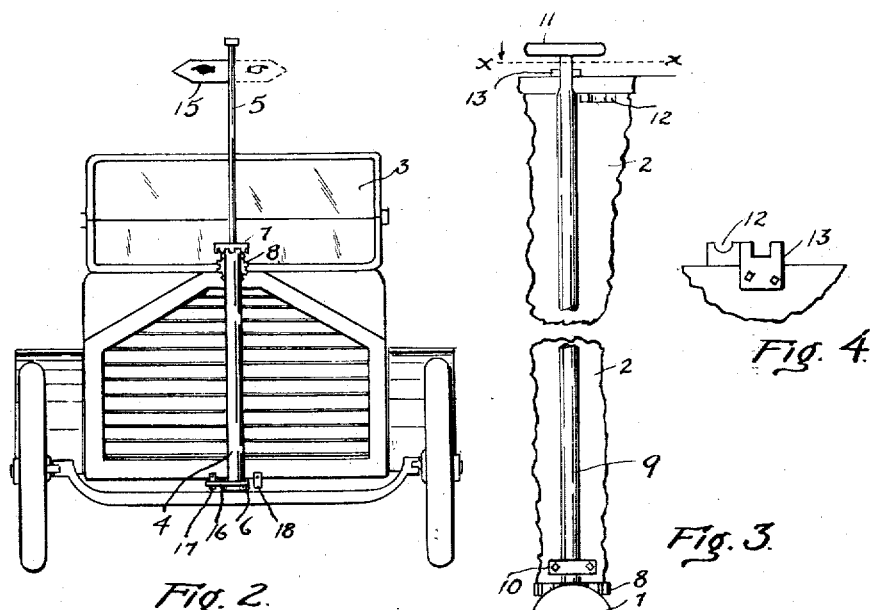
WITNESSES:
INVENTOR
Jeremiah A. Givens
BY
Claude L. McKesson
ATTORNEY

UNITED STATES PATENT OFFICE.

JEREMIAH A. GIVENS, OF LOS ANGELES, CALIFORNIA, ASSIGNOR OF ONE-HALF TO GEORGE A. RICHARDS, OF LOS ANGELES, CALIFORNIA.

VEHICLE DIRECTION-INDICATOR.

1,023,732. Specification of Letters Patent. Patented Apr. 16, 1912.

Application filed May 3, 1911. Serial No. 624,777.

*To all whom it may concern:*

Be it known that I, JEREMIAH A. GIVENS, a citizen of the United States, residing at Los Angeles, California, have invented a new and useful Vehicle Direction-Indicator, of which the following is a specification.

In the crowded streets and thoroughfares many accidents occur from the inability of pedestrians and the drivers of vehicles to determine when other passing vehicles intend to change their course. The danger of such accidents is especially great at corners and cross streets frequented by automobiles and other high speed vehicles. Pedestrians often step in front of vehicles which suddenly and unexpectedly round a corner when from every visible indication the vehicle was to have been driven straight ahead.

The object of this invention is to provide a simple and inexpensive apparatus by means of which the driver of any vehicle may exhibit a signal indicating the direction in which he intends to travel. The means by which I accomplish this beneficial result are illustrated in the accompanying drawings in which—

Figure 1 is a side view of an automobile equipped with my direction indicator. Fig. 2 is a front view of an automobile and shows the indicator shifted from the position shown in Fig. 1. Fig. 3 is a plan view of my invention and means for attaching to an automobile. Fig. 4 is a view of the latching device taken on the dotted line *x—x* in Fig. 3 in the direction indicated by the arrow. Fig. 5 is a fragmental bottom view of a portion of the automobile and parts of my device attached thereto.

Throughout the several figures like characters refer to like parts.

Referring to the details of construction: 1 is the body of an automobile having a customary hood 2 at the front part of the machine.

3 is a wind shield of an ordinary type.

A hollow boxing 4 is attached to the front end of the hood in the manner shown. A shafting 5 passes through the box 4 and a collar 6 is secured to the bottom of said shafting by means of a cotter pin or any other suitable means. A crown wheel or miter gear wheel 7 attached to the shaft 5, bearing on the upper end of the box 4, serves the purpose of a collar in supporting the said shaft. This gear 7 engaging a spur tooth or miter gear wheel 8 serves to operate the shafting 5. A shafting 9 extending along the top of the hood carries the gear 8.

10 is a bearing provided for shaft 9 near its forward end.

11 is a hand wheel attached to the inner end of the shaft 9.

12 is an open bearing placed near the back end of the shaft 9.

A square shank 14 formed on the back end of the shaft 9 engages a square open box 13 for the purpose of locking the signal in place.

A suitable indicator 15 is attached to the upper end of the shaft 5 and turns with it. A bar 16 attached to the shaft 5 near its lower end arranged to rotate between the bumpers 17 and 18 serves to stop the indicator at the extreme side position.

The method of operation is briefly described as follows: In driving straight forward along a road or street the indicator 15 points in the direction shown in Fig. 1 and Fig. 3. The square shank 14 on the shaft 9 is in the square box 13 and prevents the indicator from being turned by the wind or the vibration of the machine. Desiring to turn to the driver's right the shaft 9 is lifted out of the box 13 and the round portion of the shaft is placed in box 12. By means of the handwheel 11 the shaft is turned one fourth of a revolution, the gears 7 and 8 being equal, this turns the shaft 5 and its attached indicator until it points to the driver's right, the position shown in Fig. 2. At this point the bar 16 strikes the bumper 17. A person approaching has visible warning that the machine intends to turn to the right. If desired the indicator may be locked in this position by replacing the square shank in the box 13. The method of changing the indicator to the left is identical.

Any suitable means may be used to lock the shaft 9 and as there are many well known arrangements by which this can be accomplished I do not desire to limit myself to the particular device shown.

Other desirable places may also be found on a vehicle at which the invention may be attached as well as any of the well known means for transmitting motion, and I do not desire to limit myself to the particular manner in which my device is applied.

The direction indicator is adapted to any sort of vehicle and should be used on all.

Having thus described my invention, what I claim as new and desire to secure by Letters Patent is:—

1. In a vehicle direction indicator: the combination of a boxing attached to the front of an automobile; a vertical shafting supported by said boxing; an indicator attached to the upper end of said shafting; a gear wheel attached to said vertical shafting; a horizontal shafting supported on the hood of an automobile; means for supporting said horizontal shafting; a gear on the front end of said horizontal shafting adapted to enmesh the gear attached to the vertical shafting; a rectangular shank formed on the back end of the horizontal shafting; a rectangular box 13 adapted to receive and retain the said rectangular shank; and a handwheel attached to said horizontal shaft.

2. In a vehicle direction indicator: the combination of a vertical boxing attached to the front of an automobile; a vertical shafting supported by said boxing; an indicator attached to the upper end of said shafting; a gear wheel attached to said vertical shafting; a horizontal shafting extending along the top of the hood of an automobile; a gear wheel on the front end of said horizontal shaft adapted to engage and operate the said gear wheel attached to the said vertical shafting; a bearing adapted to retain the outer end of said horizontal shafting; a square shank formed on the back end of said horizontal shafting; an open square box adapted to receive and retain said square shank; an open round box in which the horizontal shafting is retained while being rotated; and a hand wheel attached to the back end of said horizontal shafting.

3. In a vehicle direction indicator: the combination of a vertical boxing attached to the front of an automobile; a vertical shafting supported by said boxing; an indicator attached to the upper end of said shafting; a bar attached to said vertical shaft; bumpers adapted to stop said bar when the indicator is pointed to either side position; a gear wheel attached to said vertical shafting; a horizontal shafting extending along the top of the hood of an automobile; a gear wheel on the front end of said horizontal shaft adapted to engage and operate the said gear wheel attached to the said vertical shafting; a bearing adapted to retain the outer end of said horizontal shafting; a square shank formed on the back of said horizontal shafting; an open square box adapted to receive and retain said square shank; an open round box in which the horizontal shafting is retained while being rotated; and a hand wheel attached to the back end of said horizontal shafting.

JEREMIAH A. GIVENS.

Witnesses:
ANDREW K. MARTELL,
HANNA MENDENHALL.